(12) United States Patent
Sunvold et al.

(10) Patent No.: US 7,001,618 B1
(45) Date of Patent: Feb. 21, 2006

(54) NUTRITIONAL COMPOSITION FOR WEIGHT MANAGEMENT

(75) Inventors: Gregory D. Sunvold, Eaton, OH (US); Mark A. Tetrick, Dayton, OH (US); Gary M. Davenport, Dayton, OH (US); Gregory A. Reinhart, Dayton, OH (US)

(73) Assignee: The Iams Company, Dayton, OH (US)

( * ) Notice: Subject to any disclaimer, the term of this patent is extended or adjusted under 35 U.S.C. 154(b) by 316 days.

(21) Appl. No.: 09/609,622

(22) Filed: Jul. 5, 2000

Related U.S. Application Data

(60) Provisional application No. 60/143,032, filed on Jul. 9, 1999.

(51) Int. Cl.
*A61K 35/78* (2006.01)

(52) U.S. Cl. .................. 424/655; 514/725; 514/23; 424/442; 424/725

(58) Field of Classification Search ............... 424/655; 514/725, 23
See application file for complete search history.

(56) References Cited

U.S. PATENT DOCUMENTS

| | | | |
|---|---|---|---|
| 4,656,191 A | 4/1987 | Fanelli |
| 4,828,846 A | 5/1989 | Rasco et al. |
| 4,883,672 A | 11/1989 | Shug et al. |
| 5,030,458 A | 7/1991 | Shug et al. |
| 5,085,883 A | 2/1992 | Garleb et al. |
| 5,087,623 A | 2/1992 | Boynton et al. |
| 5,104,677 A | * 4/1992 | Behr et al. |
| 5,175,156 A | 12/1992 | Boynton et al. |
| 5,192,804 A | 3/1993 | Blum et al. |
| 5,240,962 A | * 8/1993 | Nakatsu et al. |
| 5,501,857 A | 3/1996 | Zimmer |
| 5,540,917 A | 7/1996 | Isler et al. |
| 5,576,306 A | 11/1996 | Dressman et al. |
| 5,585,366 A | 12/1996 | Gallaher et al. |
| 5,605,893 A | 2/1997 | Kaufman |
| 5,616,569 A | 4/1997 | Reinhart |
| 5,626,849 A | 5/1997 | Hastings et al. |
| 5,654,028 A | 8/1997 | Christensen et al. |
| 5,714,472 A | 2/1998 | Gray et al. |
| 5,730,988 A | 3/1998 | Womack |

(Continued)

FOREIGN PATENT DOCUMENTS

CN 1135850 A 11/1996

(Continued)

OTHER PUBLICATIONS

Sunvold, G. et al., "Effect of Fermentable Fiber Consumption by the Dog on Nitrogen Balance and Fecal Microbia Nitrogen Excretion" FASEB Journal, US, Fed. of American Soc. For Experimental Biology, Bethesda, MD, vol. 10, Jan. 1, 1996, p. A.

(Continued)

*Primary Examiner*—Susan D. Coe
(74) *Attorney, Agent, or Firm*—Cynthia L. Clay; Kelly McDow-Dunham; Karen F. Clark

(57) ABSTRACT

A composition and method is provided for promoting weight loss in a mammal by feeding effective amounts of at least three nutrients selected from L-carnitine, chromium, Vitamin A, and a source of carbohydrates selected from a low glycemic index grain. The composition preferably includes all four nutrients and may be fed in an amount of 1.0 to 10.0 mg of L-carnitine per kilogram of body weight per day, from about 5.0 to about 15.0 micrograms of chromium per kilogram of body weight per day, and from about 1.0 to 3.0 grams of starch per kilogram of body weight per day.

10 Claims, 3 Drawing Sheets

U.S. PATENT DOCUMENTS

| | | | |
|---|---|---|---|
| 5,846,581 | A | 12/1998 | Catron |
| 5,869,528 | A | 2/1999 | Cavazza |
| 5,895,652 | A | 4/1999 | Giampapa |
| 5,932,258 | A * | 8/1999 | Sunvold |

FOREIGN PATENT DOCUMENTS

| | | |
|---|---|---|
| DE | 39 04 109 A | 8/1989 |
| FR | 2 735 331 A | 12/1996 |
| JP | 03094655 | 4/1991 |
| WO | WO 89/10065 A | 11/1989 |
| WO | WO 92/16218 | 10/1992 |

OTHER PUBLICATIONS

Murray, S.M. et al., "Cereal Flour Incorporation Into Premium Diets Fed to Ileal Connulated Dogs" FASEB Journal, vol. 11, 1997, p. a414 XP002141558.

Harrington-McGill, S., "Eat Right or Die Young" Dec. 12, 1996, p. 1-2, XP002141559.

Massimino, S.P. et al., "Glucose Tolerance in Old Dogs is Modified by Starch Source" FASEB Journal, vol. 13, Mar. 12, 1999, p. a375 XP002141557.

Bergman et al., "Quantitative estimation of insulin sensitivity" American Physiological Society, 1979, pp. E-667-677, vol. 236(6).

Bergman et al., "Physiologic Evaluation of Factors Controlling Glucose Tolerance in Man" J. Clin. Invest., 1981, pp. 1456-1467, vol. 68.

Milla et al., "Glycemic Response to Dietary Supplements in Cystic Fibrosis is Dependent on the Carbohydrate Content of the Formula" JPEN, 1996, pp. 182-186, vol. 20, No. 3.

McCarty, M.F., "Promotion of Hepatic Lipid Oxidation and Gluconeogenesis as a Strategy for Appetite Control" Medical Hypotheses, vol. 42, 1994, pp. 215-225.

Van Kempen, Theo A.T.G et al., "Carnitine Affects Octanoate Oxidation to Carbon Dioxide and Dicarboxylic Acids in Colostrum-Deprived Piglets: In Vivo Analysis of Mechanisms Involved Based on CoA- and Carnitine-Ester Profiles" J. Nutr. 125, 1995, pp. 238-250.

Ji, H et al., "Atlantic Salmon (*Salmo salar*) Fed L-Carnitine Exhibit Altered Intermediary Metabolism and Reduced Tissue Lipid, but No Change in Growth Rate" J. Nutr. 126, 1996, pp. 1937-1950.

Owen, K.Q. et al., "Effect of L-Carnitine and Soybean Oil on Growth Performance and Body Composition of Early-Weaned Pigs" J. Anim. Sci. 74, 1996, pp. 1612-1619.

Abstract—Sunvold, G.D. et al., "Effect of dietary carnitine during energy restriction in the canine" FASEB Journal, vol. 13, No. 4, Part 1, 1999, pp. A268.

Abstract—Freeman, L.M., "Interventional nutrition for cardiac disease" Seminars in Veterinary Medicine and Surgery (Small Animal), vol. 13, No. 4, 1998, pp. 232-237.

Abstract—Gross, K.L. et al., "Relationship of plasma carnitine levels in dogs and pigs fed supplemental dietary L-carnitine" Journal of Dairy Science, vol. 81, No. Suppl. 1, 1998, pp. 186.

Abstract—Gross, K.L. et al., "Effect of dietary carnitine or chromium on weight loss and body composition of obese dogs" Journal of Dairy Science, vol. 81, No. Suppl. 1, 1998, pp. 175.

Abstract—Kittleson, M.D. et al., "Results of the Multicenter Spaniel Trial: Taurine- and carnitine-responsive dilated cardiomyopathy in American Cocker Spaniels with decreased plasma taurine concentrations" Journal of Veterinary Internal Medicine, vol. 11, No. 4, 1997, pp. 204-211.

Abstract—Gwathmey, J.K. et al., "Pathophysiology of cardiomyopathies: Part II. Drug-induced and other interventions" Current Opinion in Cardiology, vol. 9, No. 3, 1994, pp. 369-378.

Abstract—Grandjean, D. et al., "Dietary supplementation with L-carnitine, vitamin C and vitamin B12 in sport dogs: Experimental study with sledge dogs" Recueil de Medecine Veterinaire de l'Ecole d'Alfort, vol. 169, No. 7, 1993, pp. 543-551.

Abstract—McMillin, J.B. et al., "Influence of Dietary Fish Oil on Mitochondrial Function and Response to Ischemia" Am. J. Physiol., vol. 263, No. 5 Part 2, 1992, pp. H1479-H1485.

Abstract—Grandjean, D et al., "Ergogenic Nutritional Supplementation in Efforts of Sporting Dogs" Recl. Med. Vet. Ec. Alfort, vol. 167, No. 7-8, 1991, pp. 753-761.

Abstract—Iben, C., "Effect of L-carnitine in racing sledge dogs" Wiener Tierarztliche Monatsschrift, vol. 85, No. 10, 1998, pp. 334-339.

Abstract—Goodwin, J.K. et al., "The role of dietary modification and nondrug therapy in dogs and cats with congestive heart failure" Veterinary Medicine, vol. 93, No. 10, 1998, pp. 919-926.

Abstract—Chetboul, V. et al., "Use of Isulik (R), an L carnitine supplement, in canine dilated cardiomyopathy" Point Veterinaire, vol. 29, No. 189, 1998, pp. 167-168.

Abstract—Grandjean, D. et al., "Physiopathological importance of L. carnitine in dogs" Recueil de Medecine Veterinaire, vol. 173, No. 4/5/6, 1997, pp. 95-106.

Abstract—Jacobs, G.J., "Treating cardiomyopathy in dogs and cats" Veterinary Medicine, vol. 91, No. 6, 1996, pp. 544-564.

Abstract—McEntee, K et al., "Clinical, electrocardiographic, and echocardiographic improvements after L-carnitine supplementation in a cardiomyopathic Labrador" Canine Practice, vol. 20, No. 2, 1995, pp. 12-15.

Abstract—Costa, N.D. et al., "Case report: efficacy of oral carnitine therapy for dilated cardiomyopathy in boxer dogs" Journal of Nutrition, vol. 124, No. 12 Suppl, 1994, pp. 2687S-2692S.

Abstract—Grandjean, D. et al., "Use of a nutritional supplement with L-carnitine, vitamin C and vitamin B12 in sporting dogs" Recueil de Medecine Veterinaire, vol. 169, No. 7, 1993, pp. 543-551.

Abstract—Keene, B.W., "L-carnitine supplementation in the therapy of canine dilated cardiomyopathy" Vet Clin North Am Small Anim Pract, vol. 21, No. 5, Sep. 1991, pp. 1005-1009.

Abstract—Hamlin, R.L., "Nutrition and the heart" Vet Clin North Am Small Anim Pract, vol. 19, No. 3, May 1989, pp. 527-538.

Abstract—Birkhahn, R.H. et al., "Alternate or supplemental energy sources" JPEN J Parenter Enteral Nutr, vol. 5, No. 1, Jan.-Feb. 1981, pp. 24-31.

Abstract—Suzuki, Y. et al., "Effects of L-carnitine on ventricular arrhythmias in dogs with acute myocardial ischemia and a supplement of excess free fatty acids" Jpn Circ J, vol. 45, No. 5, May 1981, pp. 552-559.

Kumar, M.V. et al., "Differential effects of retinoic acid on uncoupling protein-1 and leptin gene expression" J. Endocrinol, May 1998, pp. 1-7.

Wolf, D. P., "A Regulatory Pathway of Thermogenesis in Brown Fat Through Retinoic Acid" Nutrition Reviews, vol. 53, No. 8, 1995, pp. 230-231.

Alvarez, R. et al, "A Novel Regulatory Pathway of Brown Fat Thermogenesis" J. of Biol. Chem. , 1995, pp. 5666-5673.

Suryawan, A. et al., "Effect of Retinoic Acid on Differentiation of Cultured Pig Preadipocytes" J. Anim. Sci., 1997, pp. 112-117.

Puigserver, P. et al., "In vitro and in vivo induction of brown adipocyte uncoupling protein (thermogenin) by retinoic acid" Biochem J., 1996, pp. 827-833.

Facchini, F. et al., "Relation between dietary vitamin intake and resistance to insulin-mediated glucose disposal in healthy volunteers 1-3" American J Clin Nutr, 1996, pp. 946-949.

Abstract—Scarpace, P.J. et al., "Thermoregulation with age: role of thermogenesis and uncoupling protein expression in brown adipose tissue" Proc Soc Exp Biol Med, Feb. 1994, vol 205, no 2, pp. 154-161.

Cassard-Doulcier et al., "In Vitro Interactions in between Nuclear Proteins and Uncoupling Protein Gene Promoter Reveal Several Putative Transactivating Factors Including Ets1, Retinoid X Receptor, Thyroid Hormone Receptor, and a CACCC Box-binding Protein" J. Of Biol. Chem., 1994, pp. 24335-24342.

McCance et al., "The Composition of Foods", Royal Soc. Chemistry, 1992, p. 81.

International Organization for Standardization, Crude Protein (CP), 4 pgs from ISO Internet web site <www.iso.ch/>; accessed Jan. 24, 2000.

Hegenbart, Food Product Design: The Sweet Facts Of Confection Creation (website article); Apr. 1995, pp. 1-9.

"Purina CNM Veterinary Product Guide, 1994" Ralston Purina Company; USA, pp 1-27.

Kumar, M.V. et al., "Differential effects of retinoic acid on uncoupling protein-1 and leptin gene expression" J. Endocrinol, May 1998, pp. 1-7.

Wolf, D. P., "A Regulatory Pathway of Thermogenesis in Brown Fat Through Retinoic Acid" Nutrition Reviews, vol. 53, No. 8, 1995, pp. 230-231.

Alvarez, R. et al, "A Novel Regulatory Pathway of Brown Fat Thermogenesis" J. of Biol. Chem. , 1995, pp. 5666-5673.

Suryawan, A. et al., "Effect of Retinoic Acid on Differentiation of Cultured Pig Preadipocytes" J. Anim. Sci., 1997, pp. 112-117.

Puigserver, P. et al., "In vitro and in vivo induction of brown adipocyte uncoupling protein (thermogenin) by retinoic acid" Biochem J., 1996, pp. 827-833.

Facchini, F. et al., "Relation between dietary vitamin intake and resistance to insulin-mediated glucose disposal in healthy volunteers 1-3" American J Clin Nutr, 1996, pp. 946-949.

Abstract—Scarpace, P.J. et al., "Thermoregulation with age: role of thermogenesis and uncoupling protein expression in brown adipose tissue" Proc Soc Exp Biol Med, Feb. 1994, vol 205, no 2, pp. 154-161.

Cassard-Doulcier et al., "In Vitro Interactions in between Nuclear Proteins and Uncoupling Protein Gene Promoter Reveal Several Putative Transactivating Factors Including Ets 1, Retinoid X Receptor, Thyroid Hormone Receptor, and a CACCC Box-binding Protein" J. of Biol. Chem., 1994, pp. 24335-24342.

* cited by examiner

NUTRITIONAL COMPOSITION FOR WEIGHT MANAGEMENT

CROSS REFERENCE TO RELATED APPLICATIONS

This application claims the benefit of U.S. provisional application Ser. No. 60/143,032, filed Jul. 9, 1999.

BACKGROUND OF THE INVENTION

The present invention relates to a nutritional composition for body weight management, and more particularly to such a composition which contains a combination of ingredients which achieve weight loss in a mammal in need of treatment.

Obesity is a relatively common problem in that 30% of the population in the United States is considered to be clinically obese. In dogs and cats, the same problem exists in about 20% of the cats and 40% of dogs. Aside from psychological issues associated with being overweight in humans, humans, as well as dogs and cats that are overweight, can suffer from other physiological disorders such as diabetes, increased blood pressure, increased blood triglycerides, impaired locomotion, skeletal stress, dystocia, thyroid dysfunction, joint problems, and cancers, etc. These statistics demonstrate that obesity is a common problem in dogs, cats, and humans and illustrates the extreme need for technologies which will address and counteract this problem.

In humans, dogs, and cats, current nutritional recommendations often include the recommendation to consume a high fiber diet or foodstuffs that are high in dietary fiber. However, high fiber diets for dogs and cats are often associated with several undesirable side effects including decreased palatability of food, increased stool volume, increased defecation frequency, poor skin and hair, improper mineral balance, and decreased food digestibility. Unfortunately, even though these types of nutritional recommendations have existed for many years, the prevalence of obesity in both humans and pets has continued to increase. The relative abundant access to foods and the dietary habits of the population continues to make it a challenge for humans to lose weight. Also, because it has been demonstrated that an overweight owner is more likely to have an overweight pet, the prevalence of obesity in dogs and cats has also increased.

Another nutritional recommendation that is often made concerning weight management is to reduce dietary intake of fats. Although numerous low fat, no fat, reduced fat, and "light" types of foodstuffs have appeared and increased their presence in the human food supply, the prevalence of obesity has continued to increase.

Accordingly, there is still a need in the present art to develop a nutritional regimen that assists humans, dogs, and cats in reducing body fat and overall weight.

SUMMARY OF THE INVENTION

The present invention meets that need by providing a composition which, when fed to an obese or overweight mammal, assists that mammal in losing weight and maintaining the weight loss. The composition may be supplied either in the form of a supplement or as a part of a nutritionally complete diet. By "diet" it is meant the food or drink regularly consumed by the animal.

According to one aspect of the present invention, a composition for promoting weight loss in a mammal is provided comprising effective amounts of at least three nutrients selected from the group consisting of L-carnitine, chromium, Vitamin A, and a source of carbohydrates selected from a low glycemic index grain. In a preferred embodiment, the composition includes a combination of all four nutrients.

Preferably, the composition comprises from about 15 to 195 ppm L-carnitine, from about 10 to about 500 micrograms of chromium, and from about 50,000 IU to about 1,000,000 IU of vitamin A per kilogram of diet.

More preferably, the composition comprises from about 20 to 150 ppm L-carnitine, and most preferably from about 50 to 100 ppm L-carnitine per kilogram of diet.

The composition preferably comprises from about 50,000 IU to about 500,000 IU of Vitamin A per kilogram of diet, and more preferably, from about 50,000 IU to about 150,000 IU of Vitamin A per kilogram of diet.

The source of carbohydrates preferably comprises a low glycemic index grain selected from the group consisting of sorghum, barley, corn, and blends thereof.

The composition also preferably includes from about 18 to 40 wt % crude protein, from about 4 to 30 wt % fat, and from about 2 to 20 wt % total dietary fiber.

The composition may be used as a method of promoting weight loss in a mammal in which the mammal is fed a composition containing effective amounts of a combination of at least three nutrients selected from the group consisting of L-carnitine, chromium, Vitamin A, and a source of carbohydrates selected from a low glycemic index grain.

The composition is preferably fed in an amount of from about 1.0 to 10.0 mg of L-carnitine per kilogram of body weight per day, from about 5.0 to about 15.0 micrograms of chromium per kilogram of body weight per day, from about 200 to 600 IU of vitamin A per kilogram of body weight per day, and from about 1.0 to 3.0 grams of the carbohydrate source per kilogram of body weight per day.

More preferably, the L-carnitine is fed in an amount of from about 2.5 to about 5.0 mg per kilogram of body weight per day.

The present invention provides a multi-nutrient approach for losing weight by addressing the multiple causes for obesity. L-carnitine and/or esters thereof, are included in the composition to provide a means to burn fatty acids. Chromium is provided to improve insulin sensitivity in the mammal which aids the body in storing blood glucose more effectively. Vitamin A is present to reduce leptin levels. Leptin is a hormone that is elevated in mammals that are obese. By reducing leptin, Vitamin A helps to restore the individual to a more normal hormonal status. Reducing starch levels and/or selecting sources of carbohydrates/starches having low glycemic indices improves glucose metabolism of the individual. Improved glucose metabolism results in fewer abrupt rises and drops in blood glucose levels. As a result, the individual feels satiated more often, consumes less food, and loses weight.

Accordingly, it is a feature of the present invention to provide a composition which, when fed to an obese or overweight mammal, assists that mammal in losing weight and maintaining the weight loss. This, and other features and advantages of the present invention, will become apparent from the following detailed-description, the accompanying drawings, and the appended claims.

DETAILED DESCRIPTION OF THE PREFERRED EMBODIMENTS

Figure 1:
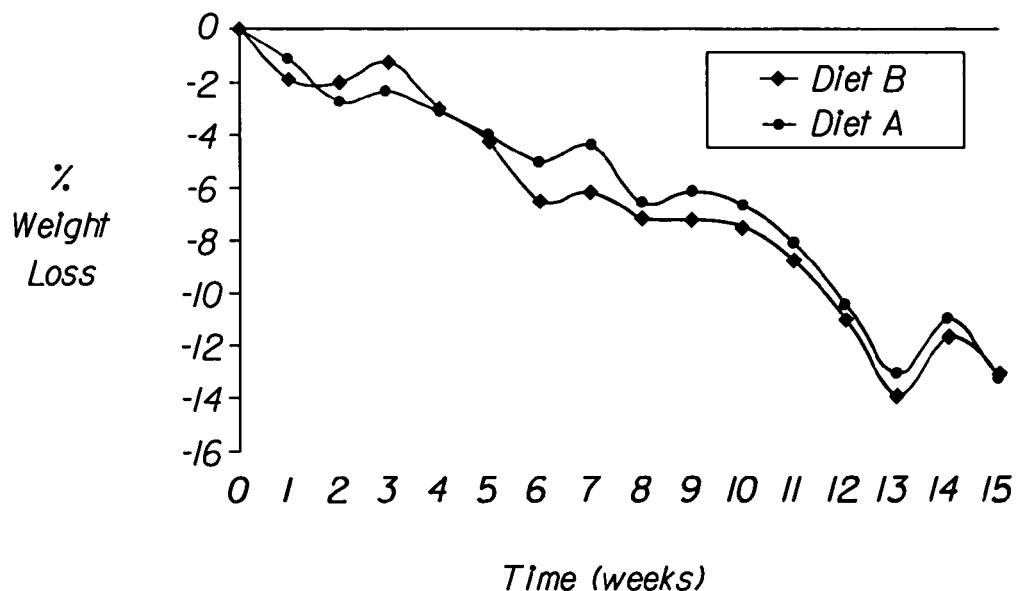
FIG. 1 is a graph comparing body weight loss in canines fed a commercial dietary formulation (diet A) and a composition formulated in accordance with the present invention (diet B)
Figure 2:
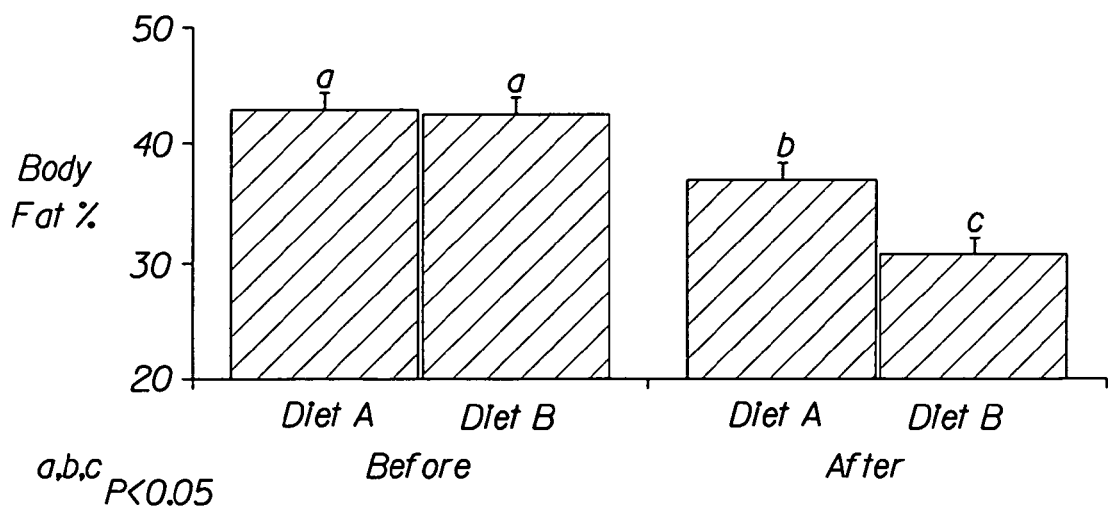
FIG. 2 is a bar graph illustrating body fat of overweight dogs fed diet A or B.

The composition of the present invention preferably includes an effective combination of at least three of L-carnitine, chromium, Vitamin A, and a source of carbohydrates having a low glycemic index.

Carnitine may be provided in the composition of the present invention using a source of L-carnitine or a carnitine ester such as carnitine tartrate, carnitine acetate, or carnitine propionate. Dietary supplementation of carnitine in amounts of from between about 15 to about 195 ppm, more preferably between about 20 to about 150 ppm, and most preferably about 50 to about 100 ppm per kilogram of diet, promotes weight loss in overweight mammals. Expressed in another way, carnitine may be fed to the mammal in amounts of from between about 1.0 to about 10.0 mg per kilogram of body weight per day, and preferably about 2.5 to about 5.0 mg per kilogram of body weight per day.

Feeding an effective amount of carnitine to mammals that are overweight results in a greater weight loss than mammals fed a diet containing no supplemental carnitine.

Further, mammals fed a carnitine-supplemented diet exhibit a greater percentage of lean body mass (LBM) than mammals fed the same diet, but with no carnitine supplementation. Also, mammals fed a carnitine-supplemented diet voluntarily restrict their food intake. Reference is also made to commonly-assigned U.S. Pat. No. 6,204,291, entitled PROCESS AND PRODUCT FOR PROMOTING WEIGHT LOSS IN OVERWEIGHT DOGS, the entire contents of which are hereby incorporated by reference.

The composition of the present invention also preferably contains a source of chromium which has the effect of minimizing the postprandial glycemic and/or insulin response in a mammal. Chromium may be provided from such bioavailable sources as chromium picolinate, chromium tripicolinate, chromium nicotinate, or chromium yeast.

For example, the composition may include chromium tripicolinate in an amount which will provide the mammal with from between about 10 to about 500 micrograms of chromium per day. Expressed in another way, chromium is present in am amount of from between about 5.0 to about 15.0 micrograms per kilogram of body weight per day. Chromium tripicolinate occurs in brewer's yeast, and the yeast may be added to the composition. Alternatively, the chromium in a substantially-pure bioavailable form may be added directly to the composition.

Vitamin A may be provided in the composition of the present invention as Vitamin A acetate or retinol, and provides sufficient Vitamin A to result in a reduction in adiposity of the mammal. In addition to reducing adiposity, Vitamin A may also increase UCP1 gene expression, suppress leptin gene expression, and suppress serum leptin levels. This aids in preventing obesity, promoting weight loss, and may also minimize age-related increases in body fat and diabetes-associated increases in body fat.

The Vitamin A is preferably provided in an amount of about 50,000 IU to about 1,000,000 IU of Vitamin A per kilogram of diet, more preferably, from about 50,000 IU to about 500,000 IU of Vitamin A per kilogram of diet, and most preferably, from about 50,000 IU to about 150,000 IU of Vitamin A per kilogram of diet. Expressed another way, Vitamin A is supplied in an amount of from between about 200 to about 600 IU per kilogram of body weight per day.

The supplement is preferably fed to a mammal in an amount of about 50,000 IU to about 1,000,000 IU of Vitamin A per day (based on a diet of 1,000 g per day), or about 5,000 IU to about 100,000 IU of Vitamin A per day (based on a diet of 100 g per day). Reference is also made to co-pending U.S. patent application Ser. No. 09/288,873, filed Apr. 9, 1999, and entitled PROCESS FOR DECREASING ADIPOSITY USING VITAMIN A AS A DIETARY SUPPLEMENT, the entire contents of which are hereby incorporated by reference.

The present invention also preferably includes a source of carbohydrates from a low glycemic index grain. Glycemic index is a measure of the rate at which carbohydrates are broken down into gluclose and absorbed by the bloodstream. Glycemic index is a relative scale measured from a reference standard food (normally 50 gm white bread=100). By "low glycemic index" it is meant that the starch source provides a glycemic response which is closer to fasting glucose and insulin levels than a reference standard carbohydrate source. Suitable low glycemic index grains include sorghum, barley, corn, and blends thereof. Brewer's rice is not a suitable grain source for the present invention. The invention may also use multiple grains comprising a blend of sorghum and barley; a blend of corn and barley; a blend of corn and sorghum; or a blend of corn, sorghum, and barley. Preferably, the weight ratio of grain sources in any blends is from about 1:5 to about 5:1, and more preferably the weight ratio of any blends contains substantially equal amounts of each grain (i.e., a 1:1 ratio). Where a combination of three grain sources is used, the weight ratios of the lowest to highest amount of grain source will vary between from about 1:1 to about 5:1. The composition of the present invention includes an amount of these starch sources to provide a mammal with from about 1.0 to about 3.0 grams of starch per kilogram of body weight per day. Reference is also made to commonly-assigned U.S. Pat. No. 5,932,258, entitled COMPOSITION AND PROCESS FOR IMPROVING GLUCOSE METABOLISM IN COMPANION ANIMALS, and U.S. patent Application Ser. No. 60/121,087, filed Feb. 23, 1999, and titled ALTERATION OF GLUCOSE METABOLISM IN COMPANION ANIMALS BY DIETARY STARCH, the entire contents of which are hereby incorporated by reference.

The nutrients described above may be provided in any suitable formulation which also provides adequate nutrition for the mammal, such as a supplement in the form of a pill or capsule, or a pet food composition. For example, a composition for use in the present invention may contain about 18–40 wt % crude protein, about 4–30 wt % fat, and about 2–20 wt % total dietary fiber. However, no specific percentages or ratios are required. Preferably, the mammal is fed a low-fat carnitine-supplemented diet to promote weight loss. A typical low-fat diet may contain about 21.1 wt % protein, about 8.6 wt % fat, and about 1.7 wt % crude fiber.

In order that the invention may be more readily understood, reference is made to the following example which is intended to illustrate the invention, but not limit the scope thereof.

EXAMPLE 1

Twenty adult female Beagle dogs were used to evaluate the effects of a multi-nutrient approach to weight loss. Fresh water was provided ad libitum during the entire study. Food was provided ad libitum during both the weight gain and weight loss phases of the study.

The study consisted of two periods: weight gain and weight loss. During the 10-week weight gain period, all dogs were fed a high-protein, high fat diet (Purina® Pro-Visions ProPlan® Chicken and Rice Performance Formula (about 35% protein, 23% fat, and 2% crude fiber). At the initiation of the weight loss period, the dogs were stratified by body weight, percent body fat, and blood glucose and then randomly assigned to 2 dietary treatment groups of 10 dogs each. Group A dogs were fed a traditional, high fiber diet (Hill's® Prescription Diet® w/d® Canine) (diet A) and Group B dogs were fed a diet formulated in accordance with the present invention (Eukanuba Veterinary Diets® Nutritional Weight Maintenance Formula™ Glucose-Control™/Canine (diet B) ad libitum.

The composition of the diets (on a dry matter basis) is shown below in Table 1.

TABLE 1

|  | Diet A | Diet B |
| --- | --- | --- |
| Protein % | 16 | 28.8 |
| Fat % | 9.7 | 7.8 |
| Ash % | 4.2 | 7.2 |
| Crude fiber % | 17.0 | 3.7 |
| Carnitine (ppm) | 250 | 60 |
| Gross Energy, Kcal/g | 4.743 | 4.604 |
| Megabolizable Energy | 3.244 | 3.509 |
| % of calories from: |  |  |
| Protein | 17.4 | 28.7 |
| Carbohydrates | 57.2 | 52.4 |
| Fat | 25.4 | 18.9 |

Diet B also contained amounts of chromium (chromium tripicolinate) and a blend of sorghum and barley as the carbohydrate source in accordance with the present invention.

Food intake and body weight were monitored daily and weekly, respectively. Whole body composition was determined at the initiation and termination of the weight loss period. Whole body composition was determined using dual energy x-ray absorptiometry (DEXA) and Hologic QDR-2000 Plus High Resolution X-Ray Bone Densitometer.

After 14 weeks of feeding diets A and B, a glucose tolerance test was performed. (Serum glucose and insulin concentrations were determined from blood obtained at 0, 2, 4, 6, 8, 10, 12, 14, 16, 19, 22, 25, 30 40, 50, 60, 70, 80, 90, 100, 120, 140, 160 and 180 min. after administering 300 mg/kg BW glucose at time 0 and 0.02 U/kg BW insulin at time 20 min.

Statistical Analysis

A repeated measures analysis was used for the statistical analysis. The model statement included the following variables: diet, time, diet x time and animal within treatment and error. The least significant difference test of the General Linear Models procedure in SAS (SAS, 1996), was used to compare means between diets within time period.

Results

Figure 3:
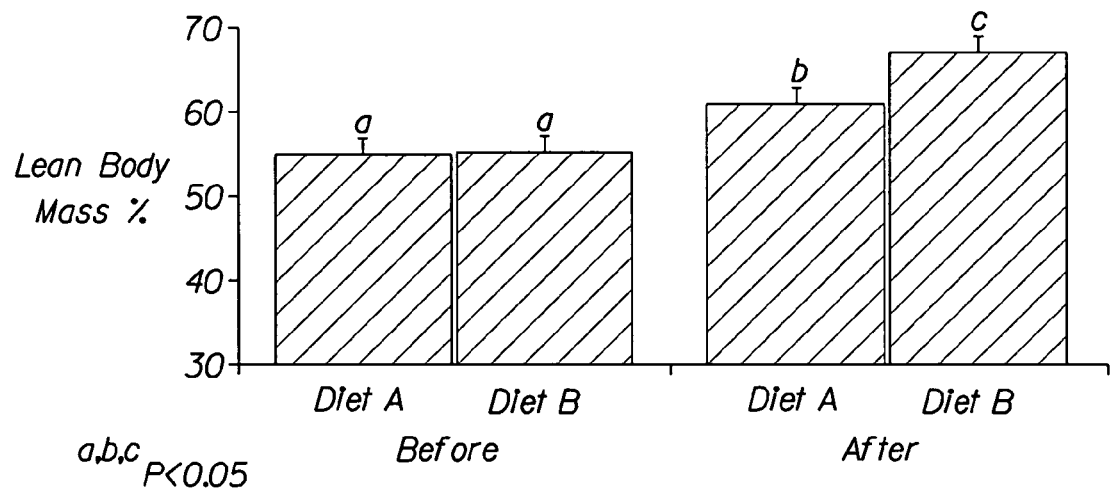
FIG. 3 is a bar graph illustrating lean body mass of overweight canines fed diet A or B.

Under ad libitum feeding conditions, dogs fed diet A and diet B lost a similar amount of body weight as shown in FIG. 1. However, dogs fed diet B lost more body fat than dogs fed diet A. Dogs fed diet B also tended to accumulate lean body mass while dogs fed diet A maintained lean body mass (see FIG. 3).

Figure 4:
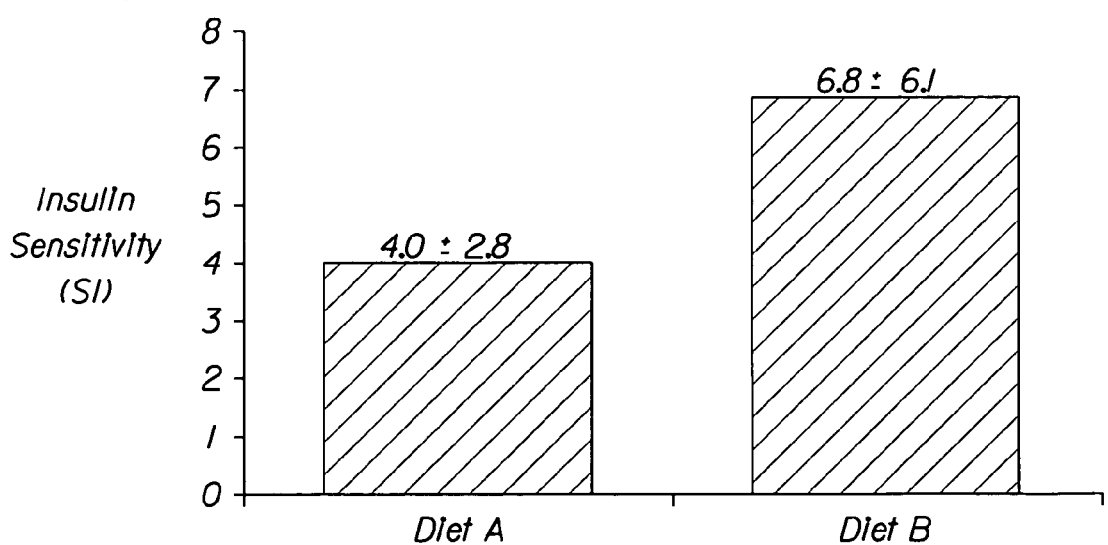
FIG. 4 is bar graph illustrating glycemic response of overweight canines after 12 weeks of consuming diet A or B.
Figure 5:
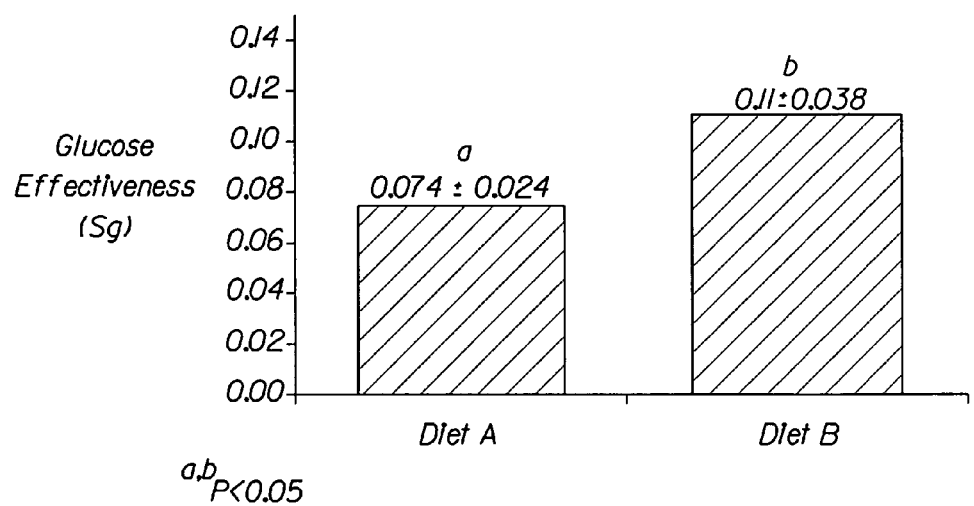
FIG. 5 is a bar graph illustrating glucose metabolism of overweight canines after 12 weeks of consuming diet A or B.

Dogs fed diet B also had a numerically more favorable insulin sensitivity than dogs fed diet A (see FIG. 4). Dogs fed diet B also had a more optimal glucose effectiveness than dogs fed Diet A (see FIG. 5).

These results indicate that the multi-nutrient composition of the present invention provides a more preferable weight loss compared to a traditional high fiber diet.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A composition comprising an effective weight reducing amount of L-carnitine, chromium, Vitamin A, and at least one carbohydrate selected from the group consisting of sorghum, barley, and mixtures thereof, which composition is formulated as a solid pet food.

2. The composition of claim 1 which comprises sorghum.

3. The composition of claim 1 which comprises barley.

4. The composition of claim 1 which comprises sorghum and barley.

5. The composition of claim 1 which comprises from about 15 to 195 ppm L-carnitine, from about 10 to about 500 micrograms of chromium, and from about 50,000 IU to about 1,000,000 IU of Vitamin A per kilogram.

6. The composition of claim 1 which comprises from about 20 to 150 ppm L-carnitine per kilogram.

7. The composition of claim 1 which comprises from about 50 to 100 ppm L-carnitine per kilogram.

8. The composition of claim 1 which comprises from about 50,000 IU to about 500,000 IU of Vitamin A pa kilogram.

9. The composition of claim 1 which comprises from about 50,000 IU to about 150,000 IU of Vitamin A per kilogram.

10. The composition of claim 1 further comprising from about 18 to about 40 weight percent crude protein, from about 4 to about 30 weight percent fat, and from about 2 to about 20 weight percent total dietary fiber.

* * * * *